United States Patent
Kapinos et al.

(10) Patent No.: US 11,314,406 B2
(45) Date of Patent: Apr. 26, 2022

(54) ADJUSTMENT OF DISPLAY PARAMETERS BASED ON USER HEIGHT AND/OR USER INPUT

(71) Applicant: Lenovo (Singapore) Pte. Ltd., Singapore (SG)

(72) Inventors: Robert J. Kapinos, Durham, NC (US); Robert Norton, Raleigh, NC (US); Russell Speight VanBlon, Raleigh, NC (US); Scott Wentao Li, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 16/862,422

(22) Filed: Apr. 29, 2020

(65) Prior Publication Data
US 2021/0342051 A1 Nov. 4, 2021

(51) Int. Cl.
*G06F 3/0488* (2022.01)
*G06F 3/04842* (2022.01)

(52) U.S. Cl.
CPC ........ *G06F 3/0488* (2013.01); *G06F 3/04842* (2013.01)

(58) Field of Classification Search
CPC ............................ G06F 3/0488; G06F 3/04842
See application file for complete search history.

(56) References Cited

U.S. PATENT DOCUMENTS

| 2008/0259048 A1* | 10/2008 | Touyamasaki ..... G03G 15/5016 345/173 |
| 2013/0290867 A1* | 10/2013 | Massand ................. G06F 3/038 715/750 |
| 2017/0060319 A1* | 3/2017 | Seo .......................... G06F 3/011 |

OTHER PUBLICATIONS

Wallace, John, "Flat-Panel Displays: Wavy prism sheet makes LCDs look better", LaserFocusWorld, Sep. 1, 2007, retrieved from https://www.laserfocusworld.com/optics/article/16552684/flatpanel-displays-wavy-prism-sheet-makes-lcds-look-better.

* cited by examiner

*Primary Examiner* — Peter D McLoone
(74) *Attorney, Agent, or Firm* — John M. Rogitz; John L. Rogitz

(57) ABSTRACT

In one aspect, a device may include at least one processor, a touch-enabled display accessible to the at least one processor, and storage accessible to the at least one processor. The storage may include instructions executable by the at least one processor to identify a height of a user. Then, based on the height of the user, the instructions may be executable to one or more of determine a first location of the touch-enabled display at which to present a selector and then present the selector at the first location, and/or determine a second location of the touch-enabled display to use as an area at which touch input that is received will correspond to selection of the selector and then undertake an action associated with selection of the selector responsive to receipt of touch input to the area.

20 Claims, 9 Drawing Sheets

1100

1102 — BEFORE BEGINNING, SELECT IN SEQUENCE:

- 1200 — RECEIVE INPUT (E.G., CAMERA INPUT, DISPLAY INPUT)
- 1202 — DETERMINE HEIGHT AND/OR MISS AMOUNT
- 1204 — DETERMINE OFFSETS FROM DEFAULT LOCATION(S)
- 1206 — PRESENT SELECTORS, ADJUST PRISMS, AND/OR MONITOR SENSITIVITY AREAS AT DIFFERENT LOCATIONS PER OFFSETS
- 1208 — RECEIVE INPUT SELECTING SELECTOR
- 1210 — PERFORM FUNCTION/ACTION ASSOCIATED WITH SELECTION OF SELECTOR

FIG. 12

SETTINGS

- ENABLE ADJUSTMENTS BASED ON USER HEIGHT/INPUTS ~ *1302*

- MOVE SELECTORS ~ *1304*
    - MOVE TOUCH AREAS ~ *1306*
    - ENLARGE TOUCH AREAS/SHRINK SELECTORS ~ *1308*
    - USE PRISMS ~ *1310*

- USE HEIGHT ~ *1312*
- USE CALIBRATION ~ *1314*    *1318*
- USE MISSES ~ *1316*
  SET THRESHOLD # OF MISSES: [2]

*1320*

SET THRESHOLD DISTANCE FOR ADJUSTMENTS: [5] FT.

FIG. 13

ADJUSTMENT OF DISPLAY PARAMETERS BASED ON USER HEIGHT AND/OR USER INPUT

FIELD

The present application relates to technically inventive, non-routine solutions that are necessarily rooted in computer technology and that produce concrete technical improvements.

BACKGROUND

As recognized herein, touch screens on standing mode kiosks are typically not height-adjustable. As also recognized herein, the taller a person is, the more difficult it may be for the person to accurately select a button or other feature well below eye level as presented on the screen. This is due to the fact that people typically touch the screen where they see the feature from their position/viewing angle rather than touching the screen orthogonally to where the feature is actually presented under the screen's glass. This may be true even though the angle at which touch screen features appear varies between taller and shorter people. But regardless of the variance, trying to control the kiosk from the person's particular viewing angle can lead to selecting unintended features presented on the screen, or not selecting any feature at all. There are currently no adequate solutions to the foregoing computer-related, technological problem related to display screens.

SUMMARY

Accordingly, in one aspect a device includes at least one processor, a touch-enabled display accessible to the at least one processor, and storage accessible to the at least one processor. The storage includes instructions executable by the at least one processor to identify a height of a user. Then, based on the height of the user, the instructions are executable to one or both of determine a first location of the touch-enabled display at which to present a selector and then present the selector at the first location, and/or determine a second location of the touch-enabled display to use as an area at which touch input that is received will correspond to selection of the selector and then undertake an action associated with selection of the selector responsive to receipt of touch input to the area.

In some implementations, the device may include a camera accessible to the at least one processor, and the instructions may be executable to identify the height of the user based on input from the camera. Further, in some examples the instructions may be executable to identify the height of the user based on input from the camera responsive to the user coming within a threshold distance of the camera.

Also in some implementations, the selector may be a first selector and the instructions may be executable to determine the first location for the first selector based on a first offset from a first default location for the first selector, where the first offset may be determined based on the height of the user. The instructions may also be executable to determine a third location for a second selector based on a second offset from a second default location for the second selector, where the second offset may also be determined based on the height of the user. In certain examples, the first default location may be above the second default location on the display. Also in some examples, the first offset may be less than the second offset.

Still further, in some implementations the instructions may be executable to determine the first location of the touch-enabled display at which to present the selector at least in part by determining a third location of the touch-enabled display at which to present a graphical user interface (GUI) that includes the selector. The instructions may then be executable to then present the GUI at the third location so that the selector is presented at the first location.

In another aspect, a method includes determining at least one offset from default for a first location of a display at which a selector is to be presented and/or a second location for a sensitivity area of the display at which user input is receivable to select the selector. The method then includes, based on the at least one offset from default, presenting the selector at the first location and/or monitoring for user input to the second location to execute at a device a function that is associated with selection of the selector. The at least one offset is determined based on user input to the display and/or based on a height of a user.

In some implementations, the at least one offset may be determined based on a height of a user as identified by the device using input from a sensor. Additionally or alternatively, the at least one offset may be determined based on user input to the display such as, for example, during a calibration process for providing user input.

The at least one offset may also be determined based on user input to the display to attempt to select the selector but that does not actually select the selector. For example, the at least one offset may be determined based on a threshold number of user inputs to the display to attempt to select the selector but that do not actually select the selector, where the threshold number may be greater than one.

In still another aspect, at least one computer readable storage medium (CRSM) that is not a transitory signal includes instructions executable by at least one processor to determine at least one offset from default for a first location of a display at which a selector is to be presented and/or a second location for a sensitivity area of the display at which user input is receivable to select the selector. Then based on the at least one offset from default, the instructions are executable to present the selector at the first location, monitor for user input to the second location to execute a function that is associated with selection of the selector, and/or adjust one or more prisms of the display to direct light from the display downward relative to an upright orientation of the display. The at least one offset is determined based on user input to the display and/or based on a height of a user.

Thus, in some implementations the instructions may be executable to determine an offset from default for the first location of the display at which the selector is to be presented, where the offset for the first location may reduce an area of the display used to present the selector so that the selector may be presented smaller than in a default presentation size for the selector. In these implementations, the instructions may then be executable to present the selector at the first location based on the offset for the first location.

Also in some implementations, the instructions may be executable to determine an offset from default for the second location for the sensitivity area of the display, where the offset for the second location may enlarge the size of the sensitivity area relative to a default size for the sensitivity area. The instructions may then be executable to, based on the offset for the second location, monitor for user input to the second location to execute the function that is associated with selection of the selector.

Still further, in some implementations the instructions may be executable to, based on the at least one offset from default, adjust one or more prisms of the display to direct light from the display downward relative to an upright orientation of the display.

The details of present principles, both as to their structure and operation, can best be understood in reference to the accompanying drawings, in which like reference numerals refer to like parts, and in which:

BRIEF DESCRIPTION OF THE DRAWINGS

FIG. 11 shows a GUI that may be used as part of a calibration process for determining offsets for presentation of graphical elements consistent with present principles;

FIG. 12 is a flow chart of an example algorithm consistent with present principles;

FIG. 13 shows an example GUI that may be used for configuring one or more settings of a device that operates consistent with present principles.

DETAILED DESCRIPTION

Figure 1:
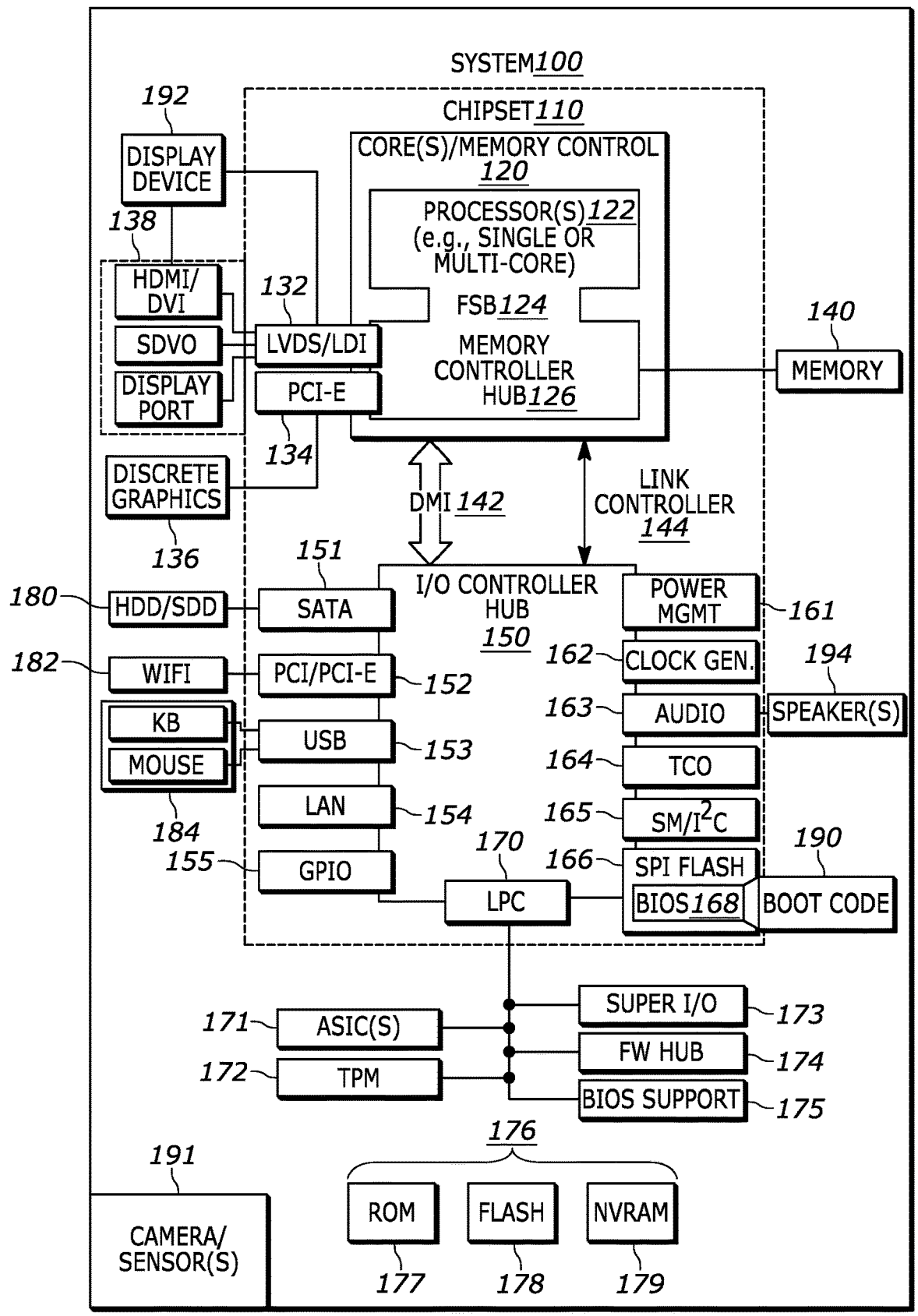
FIG. 1 is a block diagram of an example system consistent with present principles.

The present application discloses, among other things, systems and methods to allow a user to select a graphical element on a display based on where the user sees the element from his or her viewing angle. For example, a kiosk or other device may include a compensating adjustment mechanism to raise and lower buttons presented on the device's display, as well as to lower and raise corresponding touch areas on the screen, based on user height. Buttons and touch areas may also be moved laterally on the display as well.

In certain implementations, this compensation may be non-linear so that, for example, buttons closer to the user's eyes height may be adjusted up or down less than buttons that are farther away. In some examples, this may be done using an inverse cosine function.

Compensation may include moving the onscreen buttons, moving the touch screen targets themselves that correspond to different buttons, enlarging the corresponding touch screen targets, reducing button size, and/or programming the touch screen with compensating parameters so it internally adjusts the coordinates e.g. for an entire graphical user interface (GUI).

Compensations may be calculated a number of ways. For example, in one embodiment the device may present an onscreen control with a calibration target(s) for a user to select to adjust display presentations. Additionally or alternatively, a camera may detect the height of the user and automatically adjust display presentations. Still further, a sequence of button misses may cause the device to calculate the user's height and automatically compensate. Also, the prisms in the glass for a display screen may be adjusted to compensate out the angular distortion caused by the glass.

Prior to delving further into the details of the instant techniques, note with respect to any computer systems discussed herein that a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple Inc. of Cupertino Calif., Google Inc. of Mountain View, Calif., or Microsoft Corp. of Redmond, Wash. A Unix® or similar such as Linux® operating system may be used. These operating systems can execute one or more browsers such as a browser made by Microsoft or Google or Mozilla or another browser program that can access web pages and applications hosted by Internet servers over a network such as the Internet, a local intranet, or a virtual private network.

As used herein, instructions refer to computer-implemented steps for processing information in the system. Instructions can be implemented in software, firmware or hardware, or combinations thereof and include any type of programmed step undertaken by components of the system; hence, illustrative components, blocks, modules, circuits, and steps are sometimes set forth in terms of their functionality.

A processor may be any general purpose single- or multi-chip processor that can execute logic by means of various lines such as address lines, data lines, and control lines and registers and shift registers. Moreover, any logical blocks, modules, and circuits described herein can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can also be implemented by a controller or state machine or a combination of computing devices. Thus, the methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may also be embodied in a non-transitory device that is being vended and/or provided that is not a transitory, propagating signal and/or a signal per se (such as a hard disk drive, CD ROM or Flash drive). The software code instructions may also be downloaded over the Internet. Accordingly, it is to be understood that although a software application for undertaking present principles may be vended with a device such as the system 100 described below, such an application may also be downloaded from a server to a device over a network such as the Internet.

Software modules and/or applications described by way of flow charts and/or user interfaces herein can include various sub-routines, procedures, etc. Without limiting the disclosure, logic stated to be executed by a particular module can be redistributed to other software modules and/or combined together in a single module and/or made available in a shareable library.

Logic when implemented in software, can be written in an appropriate language such as but not limited to hypertext markup language (HTML)-5, Java/JavaScript, C# or C++, and can be stored on or transmitted from a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

The term "circuit" or "circuitry" may be used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Now specifically in reference to FIG. 1, an example block diagram of an information handling system and/or computer system 100 is shown that is understood to have a housing for the components described below. Note that in some embodiments the system 100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine in accordance with present principles may include other features or only some of the features of the system 100. Also, the system 100 may be, e.g., a game console such as XBOX®, and/or the system 100 may include a mobile communication device such as a mobile telephone, notebook computer, and/or other portable computerized device.

As shown in FIG. 1, the system 100 may include a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 can further include a low-voltage differential signaling interface (LVDS) 132. The LVDS 132 may be a so-called LVDS Display Interface (LDI) for support of a display device 192 (e.g., a CRT, a flat panel, a projector, a touch-enabled light emitting diode display or other video display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (×16) PCI-E port for an external PCI-E-based graphics card (including, e.g., one of more GPUs). An example system may include AGP or PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more USB interfaces 153, a LAN interface 154 (more generally a network interface for communication over at least one network such as the Internet, a WAN, a LAN, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes BIOS 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 may provide for communication with various devices, networks, etc. For example, where used, the SATA interface 151 provides for reading, writing or reading and writing information on one or more drives 180 such as HDDs, SDDs or a combination thereof, but in any case the drives 180 are understood to be, e.g., tangible computer readable storage mediums that are not transitory, propagating signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

As also shown in FIG. 1, the system 100 may also include one or more cameras or other sensors 191. If the sensor(s) 191 include a camera, the camera may gather/generate one or more images and provide them to the processor 122, e.g., to determine a height of a user consistent with present principles. Thus, the camera may be a thermal imaging camera, an infrared (IR) camera, a digital camera such as a webcam, a three-dimensional (3D) camera, and/or a camera otherwise integrated into the system 100 and controllable by the processor 122 to gather pictures/images and/or video. In embodiments where the sensor(s) 191 include other sensors besides a camera, those sensors may include a laser rangefinder, ultrasonic sensor, an infrared (IR) proximity sensor, and/or a light emitting diode (LED) time of flight sensor, for example.

Additionally, though not shown for simplicity, in some embodiments the system 100 may include a gyroscope that senses and/or measures the orientation of the system 100 and provides related input to the processor 122, as well as an accelerometer that senses acceleration and/or movement of the system 100 and provides related input to the processor 122. Still further, the system 100 may include an audio receiver/microphone that provides input from the microphone to the processor 122 based on audio that is detected, such as via a user providing audible input to the microphone. Also, the system 100 may include a global positioning system (GPS) transceiver that is configured to communicate with at least one satellite to receive/identify geographic position information and provide the geographic position information to the processor 122. However, it is to be understood that another suitable position receiver other than a GPS receiver may be used in accordance with present principles to determine the location of the system 100.

It is to be understood that an example client device or other machine/computer may include fewer or more features than shown on the system 100 of FIG. 1. In any case, it is to be understood at least based on the foregoing that the system 100 is configured to undertake present principles.

Figure 2:
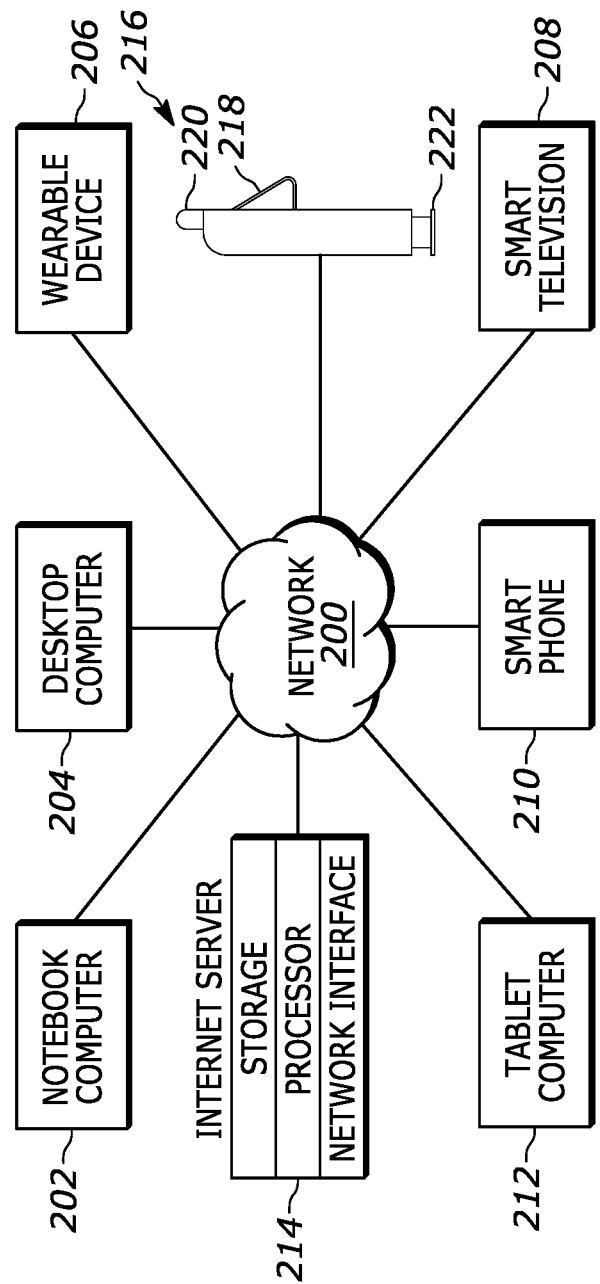
FIG. 2 is a block diagram of an example network of devices consistent with present principles.

Turning now to FIG. 2, example devices are shown communicating over a network 200 such as the Internet in accordance with present principles. It is to be understood that each of the devices described in reference to FIG. 2 may include at least some of the features, components, and/or elements of the system 100 described above. Indeed, any of the devices disclosed herein may include at least some of the features, components, and/or elements of the system 100 described above.

FIG. 2 shows a notebook computer and/or convertible computer 202, a desktop computer 204, a wearable device 206 such as a smart watch, a smart television (TV) 208, a smart phone 210, a tablet computer 212, a kiosk 216, and a server 214 such as an Internet server that may provide cloud storage accessible to the devices 202-212, 216. It is to be understood that the devices 202-216 may be configured to communicate with each other over the network 200 to undertake present principles.

Describing the kiosk 216 in more detail, it may include a touch-enabled display 218 for presenting graphical user interfaces and selectors consistent with present principles. The kiosk 216 may also include a camera 220 that may be used by the kiosk 216 (and/or server 214) determine a height of a person once the person comes within a threshold distance of the kiosk 216 as determined by the kiosk 216 itself.

The kiosk 216 may be located, for example, in a public area for different people of various heights to interact with it. The display 218 may or may not be height-adjustable relative to ground while a base 222 of the kiosk 216 rests on the ground. In some examples and as shown in FIG. 2, the outer surface of the display 218 may be oriented in a plane that is oblique but not orthogonal to ground, though in other embodiments it may be oriented in a plane orthogonal to ground. Consistent with present principles, a user may approach the kiosk 216 and provide input to the display 218 for the kiosk 216 to undertake an action, such as receiving and submitting a food order to a restaurant kitchen, receiving registration information for a conference and saving that registration information to the cloud, receiving details for technical support assistance in relation to a smart phone issue the user is having, etc.

Figure 3:
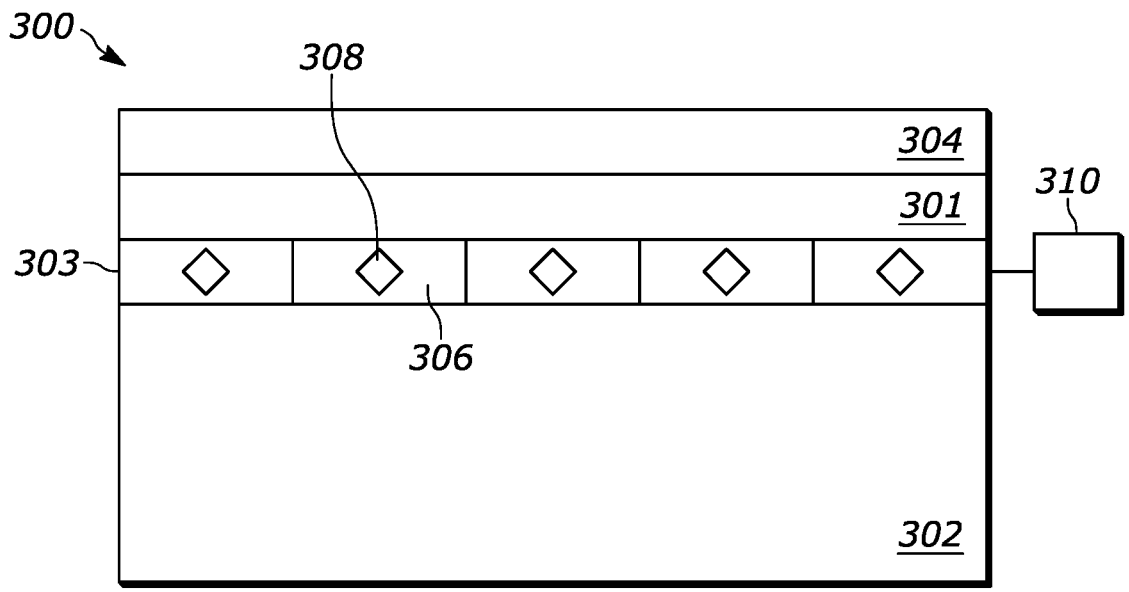
FIG. 3 shows a side cross-sectional view of an example touch-enabled display that may be used consistent with present principles.

FIG. 3 shows a side cross-sectional view of a touch-enabled display 300 that may be used consistent with present principles. The display 300 may include a display section or layer 302 including processing components, light emitting diodes, liquid crystals, color filters, etc. for presenting selectors and other visual content consistent with present principles. The display 300 may also include a touch sensing section or layer 301 that may include touch-sensors/electrodes in grid format for sensing touch input to the display consistent with present principles. For example, the layer 301 may be established by a capacitive or resistive touch-sensing layer. Other touch sensing technologies may also be used.

Furthermore, the display 300 may also include an outer layer or surface 304 made of transparent glass or another suitable material. The outer layer 304 may establish an outer-most surface of the display 300 that a user may touch to provide input to the layer 301 consistent with present principles. The layer 304 may thus establish a bezel around the edges of the display as well as a transparent section inside the edges for content viewing while also protecting internal components of the display such as the layers 301, 302, and 303 from shock, water damage, etc.

Describing the aforementioned layer 303 in more detail, this layer may be included in a touch-enabled display in some but not necessarily all embodiments. As shown in FIG. 3, the layer 303 may include respective transparent chambers 306 that themselves may include respective prisms or lenses 308. Each prism 308 may have its angle of orientation within the respective chamber 306 changed in two or all three dimensions using a micro-electromechanical system (MEMS) that may include a motor 310 for changing the orientation of the prism 308 to refract light from LEDs in the section 302 as it passes through the layer 303 and eventually out of the display 300 consistent with present principles. However, also note that the orientation of the prisms may also remain static in certain examples and simply direct light down (or up) at a predefined angle regardless of the height of any particular user.

Now describing FIGS. 4-7, various example configurations of a display presentation are shown. The presentation is presented on a touch-enabled display 400 of a device that operates consistent with present principles, such as the system 100 and/or kiosk 216 discussed above. The display 400 may also be similar to the display 300, for example.

Figure 4:
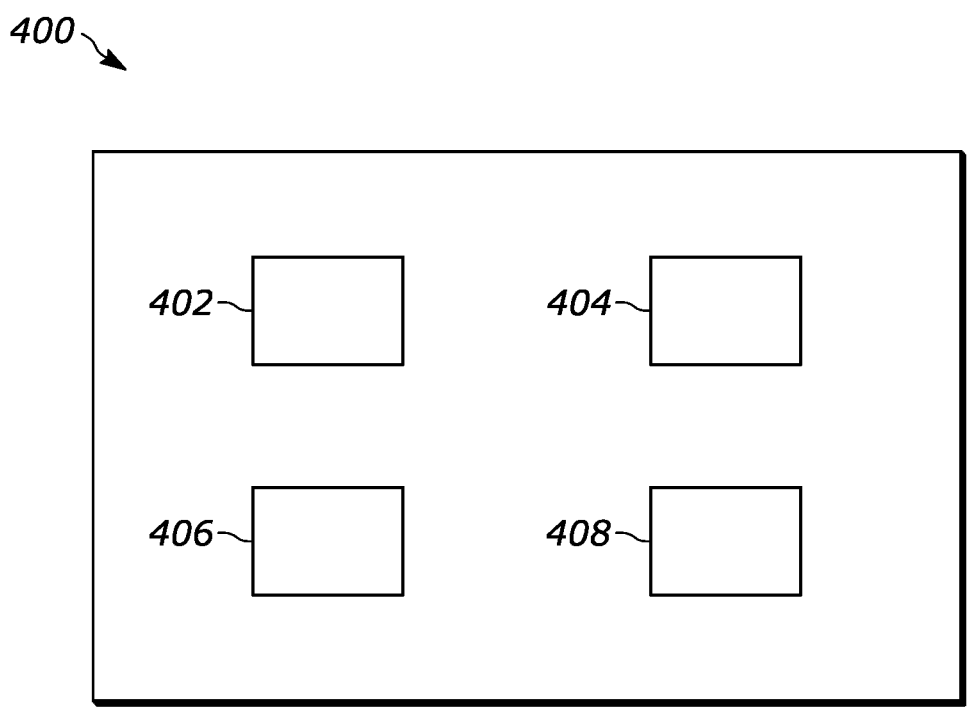
FIG. 4 shows selectors presented on a touch-enabled display at default locations consistent with present principles.

As shown in FIG. 4, each of the selectors 402, 404, 406, and 408 are presented on the touch-enabled display 400 in default sizes and at respective default locations, e.g., configured by the device manufacturer or system developer. Though not shown in FIG. 4, it is to be understood that respective sensitivity areas of the display's touch sensing layer may be established to overlap respective selectors 402-408 in X and Y dimensions in a plane parallel to the display layer of the display presenting the selectors 402-408 themselves (e.g., layer of light emitting diodes, liquid crystals, and color filters, etc.). The sensitivity areas may be monitored using the touch sensing layer's electrodes to detect touch input from a user and to associate that touch input with selection of the respective selector. Selection of the selector by directing touch input to the corresponding sensitivity area may in turn cause the device to undertake a certain action or to execute a certain function. Note that touch input to areas outside of the sensitivity areas may also be detected by the device's touch sensing layer, but the device may not associate those inputs with selection of a respective selector since no selector is presented at overlapping X and Y coordinates in the display layer itself.

Before detailing FIGS. 5-7, it is to be understood that the description of various locations of sensitivity areas in the touch sensing layer in relation to the locations of respective selectors in the display layer will be made in terms of X and Y coordinates in the parallel planes for the layers themselves.

Figure 5:
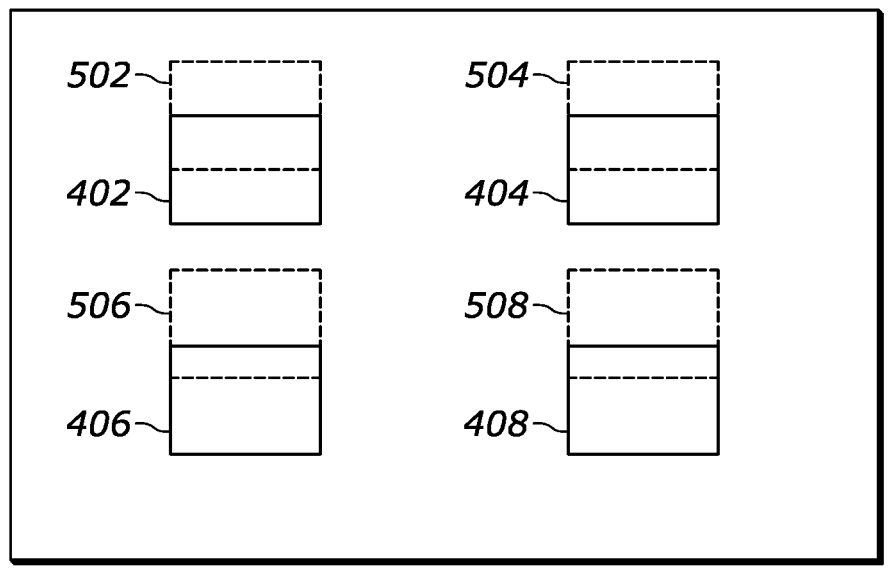
FIGS. 5-7 show the selectors as presented with offsets to compensate for user height and/or previous user input consistent with present principles.

Now describing FIG. 5, suppose a user approaches the display 400 as disposed on a kiosk or other device at a public location. Also suppose that the user's height results in the user's eyes being above the display 400 while the user stands in front of the display 400 to interact with it. The device may identify the user's overall height with respect to ground as well as possibly identifying the location (and/or height) of the user's eyes themselves. The device may identify height using an image(s) from a camera on or in communication with the device to then execute spatial analysis software and/or object recognition software to determine the height based on the known sizes and known locations of other objects also shown in the same image(s). A laser rangefinder, ultrasonic sensor, infrared (IR) proximity sensor, light emitting diode (LED) time of flight sensor, and still other types of sensors may also be used for determining the height.

As for the location of the user's eyes, they may be identified using input from the camera as well as object and/or facial recognition. Facial mapping may also be used to identify height if, e.g., a laser rangefinder or LED time of flight sensor were used.

Furthermore, note that in some examples height and/or eye location may be determined responsive to the device monitoring input from the camera or other sensor to determine that the user has come within a threshold distance to the device, such as within three feet, so as to not consume processing resources calculating the height of every person outside the threshold distance who might just happen to walk by. The user's height may also be determined responsive to the user directing touch input to the display, such as input to the display anywhere or input that the device recognizes as a sequence of misses where the user does not actually touch the display at a location corresponding to a selector.

Once the user's height has been determined, the device may then determine respective offsets for the selectors 402-408 to present the selectors 402-408 at respective locations that are different from their default locations as show in FIG. 4. Additionally or alternatively, the device may determine offsets for the respective touch sensitivity areas 502-508 that correspond to respective selectors 402-408. Thus, because the device has determined that the user's eye height is higher than the display and/or the default locations for the selectors 402-408 themselves, the device may do one or both of shift the location touch sensitivity areas 502, 504 up from their default locations by a first amount, and/or shift the location of the selectors 402, 404 down from their default locations by a second amount. This will help the device correctly interpret a selection of one of the selectors 402,404 despite the user viewing the selectors 402, 404 from above, which might otherwise cause the user to miss by touching higher up the display than where the corresponding sensitivity area for the intended selector would be located by default.

Still in reference to FIG. 5, also note that the viewing angle of the user with respect to horizontal may be even greater for the selectors 406, 408 than for the selectors 402, 404 since the user's eyes are located above the display and the selectors 406, 408 are located farther down the display than the selectors 402, 404. Accordingly, based on the height of the user, the device may also do one or both of shift the location touch sensitivity areas 506, 508 up from their default locations by a third amount greater than the first amount, and/or shift the location of the selectors 406, 408 down from their default locations by a fourth amount greater than the second amount. This too will help the device correctly interpret selections of one of the selectors 406,408 despite the user viewing the selectors 406, 408 from above.

The difference between the first and third amounts, and/or between the second and fourth amounts, may be determined different ways. For example, input from a camera may be used to determine adjacent and hypotenuse distances with respect to the user's eyes in relation to the display. Those distances may then be used in an inverse cosine function in order to determine the user's viewing angle to a given selector. Then the locations of each of the selectors and/or sensitivities areas may be offset according to the angle. For example, the offsets may be proportional so that the offsets increase by a certain preset increment or amount for each additional degree (or each additional N degrees) of the viewing angle itself. As another example, offsets may be indicated in a relational database accessible via local or cloud storage, where the relational database may indicate respective offset amounts for various viewing angles determined using an inverse cosine function.

As yet another example, various overall identified user heights (or identified eye heights from ground) may themselves be correlated in a relational database to different offsets so that the offsets may increase as the difference (e.g., in the Y dimension) between the selector's default location height from ground and the user's height from ground increases. This database may also be accessible via local storage at the device or cloud storage at a remotely-located server.

Note that any of the relational databases discussed above may be configured by a system administrator or software developer.

Figure 6:
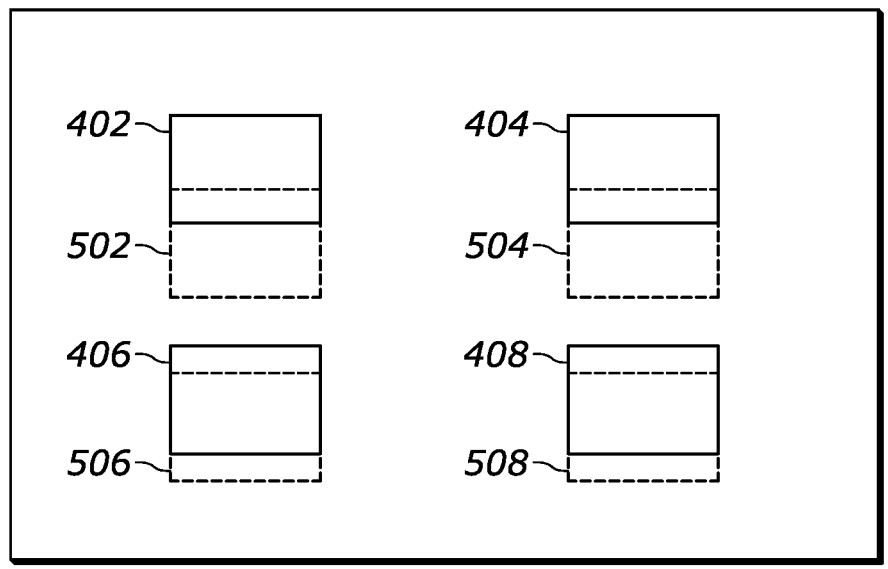

Now describing FIG. 6, this figure shows another example of the selectors 402-408 and touch sensitivity areas 502-508 consistent with present principles. Assume for FIG. 6 that a user has approached the display, but this time the user's overall height (from top of head to ground while standing) and/or eye height (from ground while standing) is lower than the height from ground of the selectors 402-408 as presented on the display 400. Because of this, the device may do one or both of shift the location touch sensitivity areas 506, 508 down from their default locations by a fifth amount, and/or shift the location of the selectors 406, 408 up from their default locations by a sixth amount. Here again this will help the device correctly interpret selections of one of the selectors 406, 408, this time despite the user viewing the selectors 406, 408 from below.

Still in reference to FIG. 6, also note that the viewing angle of the user with respect to horizontal may be even greater for the selectors 402, 404 than for the selectors 406, 408 since the user's eyes are located below the display and the selectors 402, 404 are located farther up the display than the selectors 406, 408. Accordingly, based on the height of the user the device may also do one or both of shift the location touch sensitivity areas 502, 504 down from their default locations by a seventh amount greater than the fifth amount, and/or shift the location of the selectors 402, 404 up from their default locations by an eighth amount greater than the sixth amount.

The difference between the fifth and seventh amounts, and/or between the sixth and eighth amounts, may be determined different ways as described above. For example, an inverse cosine function and/or relational database may be used as described above.

Before moving on to the description of other figures, note that notwithstanding the examples of FIGS. 5 and 6 above, in other examples the offsets for various selectors and/or sensitivity areas may be the same regardless of their default locations on the display. For example, a relational database may be used that correlates a single offset amount for either one of the selectors or sensitivity areas to a particular user height without the offset amounts increasing as the difference increases between the user's height and the default heights for the selectors/sensitivity areas.

Figure 7:
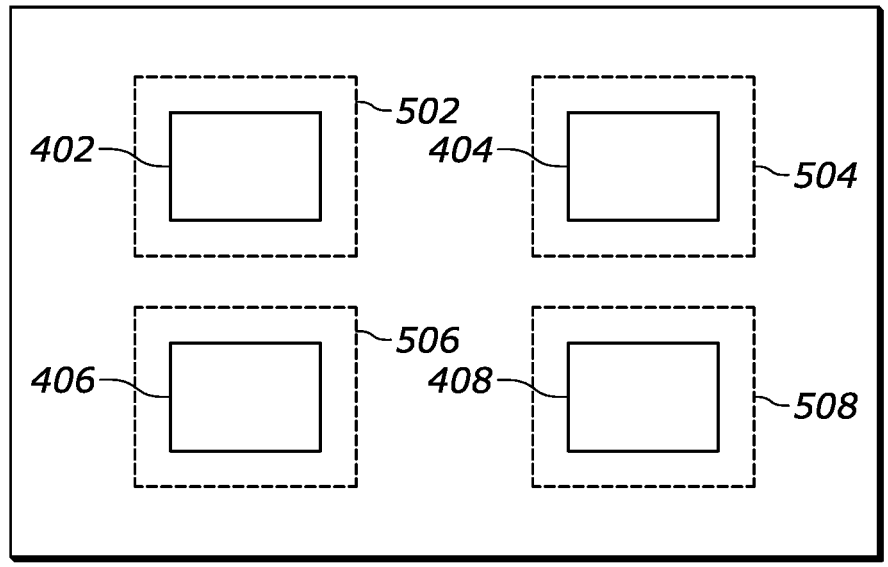

Now describing FIG. 7, it shows another example implementation consistent with present principles. FIG. 7 shows that in some embodiments, the selectors 402-408 may be offset from default by being reduced in size in both the X and Y dimensions so that the greater the difference between the user's height and a respective height of one of the selectors 402-408, the smaller the respective selector 402-408 may be presented. Additionally or alternatively, the sensitivity areas 502-508 may be offset from default to have their areas increased in size in both X and Y dimensions so that the greater the difference between the user's height and respective height of a respective area 502-508, the greater the area used for receiving touch inputs that may be correlated to selection of the respective selector.

Note that the offsets in the example of FIG. 7 may also be determined as set forth above. For example, an inverse cosine function may be used to determine a user's viewing angle to the respective selector relative to normal. Then the sizes of one or both of the selectors and/or sensitivities areas may be offset from default size (reduced or enlarged, respectively) proportional to the viewing angle according to preset amounts or entries in a relational database. However, also note that in some examples the offsets from default for either of the areas of the selectors 402-408 or sensitivity areas 502-508 may be the same for a given user's height, regardless of if some selectors 402-408 or areas 502-508 have higher default display locations than others.

Figure 8:
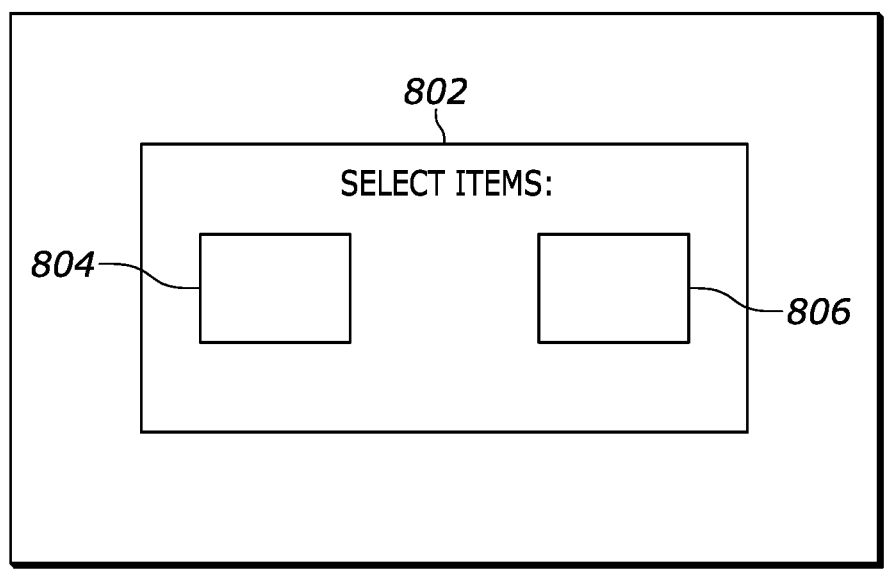
FIG. 8 shows a graphical user interface (GUI) presented on a touch-enabled display at a default location consistent with present principles.
Figure 9:
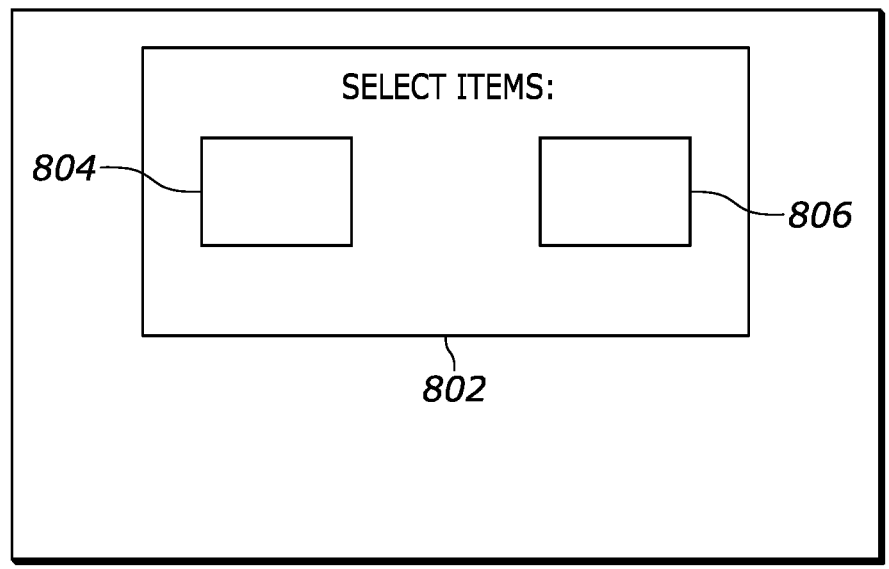
FIGS. 9 and 10 show the GUI presented with offsets to compensate for user height and/or previous user input consistent with present principles.
Figure 10:
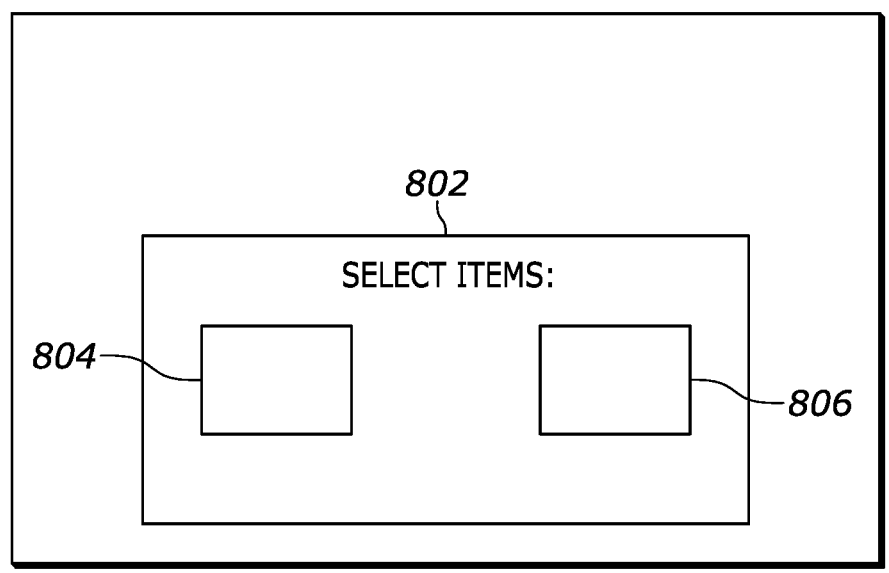

Continuing the detailed description in reference to FIGS. 8-10, they show an example graphical user interface (GUI) 802 as presented on a touch-enabled display 800 of a device that operates consistent with present principles. FIG. 8 shows a default presentation for the GUI 802 in which the GUI 802 is presented centrally in the middle of the display 800 and includes selectors 804, 806. However, suppose a user's eye height is identified as being higher than the height of the GUI 802 itself. In response to identifying as much, the device may move the entire GUI 802 along with its selectors 804, 806 higher up the display 800 to a different area than default, as shown in FIG. 9. The amount by which the GUI 802 is offset from default may be determined using any of the methods described above. For example, a relational database indicating preset offset amounts for different user heights may be used as described above.

However, as another method for determining offsets, if the user's line of sight straight ahead at the height of the user's eyes themselves is identified as intersecting another area of the display 800 above the location at which the GUI 802 is presented by default, the GUI 802 may be moved up so that it is centered at the intersection area. Note that in some examples, this technique may also apply to moving the individual selectors and sensitivity areas described above in reference to FIGS. 4-7 as well, e.g., at least as far as moving those selectors and areas up to eye height even if not centered laterally on the display.

Also in various examples, note according to FIGS. 8 and 9 that if the user's eye height is still higher than a top-most portion of the display 800 on which images are presentable, then the device may move the GUI 802 up so that the top boundary of the GUI 802 is up against the top-most portion (or only a maximum threshold distance away from it). This too may apply to moving individual selectors and sensitivity areas according to FIGS. 4-7.

Now in reference to FIG. 10, this figure shows that the same principles may apply when a user's eye height is identified as being lower than the default height of the GUI 802 itself. In response to identifying as much, as shown in FIG. 10 the device may move the entire GUI 802 along with its selectors 804, 806 lower down the display 800 to a different area than default. So here too the amount by which the GUI 802 is offset from default may be determined using any of the methods described above in reference to FIGS. 4-7.

The other methods described above in reference to FIG. 9 may also be used. For example, according to FIG. 10 the device may move the GUI 802 lower on the display to be centered where the user's line of sight intersects the display.

Or if the user's eye height is still lower than a lower-most portion of the display 800 on which images are presentable, then the device may move the GUI 802 up so that the bottom boundary of the GUI 802 is up against the lower-most portion (or only a maximum threshold distance away from it).

Accordingly, FIGS. 9 and 10 demonstrate that a GUI may be presented at a location other than its default location based on user height (or user input as will be described further below). As such, the individual selectors 804, 806 on the GUI 802 and their corresponding sensitivity areas may also be adjusted to locations other than their default locations according to the offset for the GUI 802 itself. This may be true even though the selectors 804, 806 and corresponding sensitivity areas may stay at the same position with respect to each other inside the GUI 802 itself.

Now in reference to FIG. 11, it shows an example calibration GUI 1100 that may be presented on a touch-enabled display to determine offsets consistent with present principles. The GUI 1100 may be presented, for example, responsive to the device identifying a person coming within a threshold distance of the device as described herein. Furthermore, user inputs to the GUI 1100 that the device uses for determining offsets may be used in addition to or in lieu of using a user's overall or eye height for determining offsets according to any of the examples of FIGS. 4-10 above.

As shown, the GUI 1100 may include a prompt 1102 asking the user to select the boxes 1104-1114 shown in the numerical sequence indicated on the faces of the boxes 1104-1114 themselves. The location of the boxes may seem random but may be chosen by a system administrator or software developer in order to identify vertical offsets for selectors and sensitivity areas consistent with present principles and to also possibly identify horizontal offsets as well if, for example, the user is not standing directly in front of the kiosk but is instead standing slightly off to one side. Note that areas of the respective sensitivity areas for each box 1104-1114 may be larger than the corresponding areas of the respective boxes 1104-1114 themselves.

Thus, the device may compute offsets in the X and Y dimensions responsive to a user touching the boxes 1104-1114 in the numerical sequence shown in the boxes 1104-1114. For example, if the user consistently misses touching the boxes 1104-1114 by touching above the bounds of each box but still within the respective sensitivity area for each box, a vertical offset may be determined to move selectors and associated sensitivity areas up by an amount that is the average of the miss distances above the bounds of the boxes 1104-1114. Or, the misses may be relative to the center point of the boxes 1104-1114 (e.g., even if the user does not miss touching the boxes entirely), and offsets may be similarly determined based on the user missing the center of the boxes 1104-1114.

As another example, rather than using an average, the device may determine individual offsets for selectors and sensitivity areas of different default display heights to correspond to respective miss distances for boxes 1104-1114 at the same or a similar display height (e.g., plus or minus a threshold amount such as two centimeters). These individual offsets may be determined regardless of whether the misses are relative to a center point or boundary of a given box.

Note that the foregoing methods for determining offsets using user input to the display may also apply to offsets in other display directions to correspond to misses, e.g., to the left, right, and bottom of the boxes 1104-1114.

Further note that the same type of methods for determining offsets based on user input to the display as described in reference to FIG. 11 may also be used after the calibration process, or in examples where the calibration process is not used, by determining offsets based on various user inputs that are received at the display as a user attempts to select certain selectors themselves to command the device to undertake an action. For example, offsets may be determined as the user attempts to select any of the selectors described above in reference to FIGS. 4-10

Referring now to FIG. 12, it shows example logic that may be executed by a device such as the system 100 in accordance with present principles. Beginning at block 1200, the device may receive input such as input from a camera or input from a touch-enabled display on the device. The logic may then move to block 1202.

At block 1202 the device may determine a user's height and/or an amount by which the user misses a selector or box as described above in reference to FIG. 11. The logic may then move to block 1204 where the device may determine offsets from default locations for various selectors and sensitivity areas based on the height or miss amount(s). Thereafter the logic may proceed to block 1206.

At block 1206 the device may present selectors, and/or adjust corresponding sensitivity area locations to monitor, according to the offsets. Additionally or alternatively, at block 1206 the device may also adjust the orientation of prisms within the display (such as the prisms 308 described above) to bend light according to the offsets to give the user a more accurate impression of the location of the selectors and hence where to touch the display for selecting them notwithstanding the user's viewing angle to the respective selectors. To this end, a relational database indicating respective prism orientations for various offsets (and/or user heights, and/or miss amounts) may be accessed for determining the appropriate prism orientations. Thus, the relational database may have been configured by a system administrator to, for example, command the prisms 308 of FIG. 3 to deflect light at downward angles for people with eye heights higher than a given selector and to deflect light at upward angles for people with eye heights lower than the selector.

From block 1206 the device may proceed to block 1208. At block 1208 the device may receive input to a sensitivity area corresponding to a respective selector, indicating the user's selection of the respective selector. Responsive to receipt of the input at block 1208, the logic may move to block 1210 where the device may perform an action or function associated with selection of the selector.

For example, the selector that is selected may be a "submit" selector that may be selectable to submit information the user has already entered at the device. As another example, the selector that is selected may be a selector to select a particular item of food that the user will purchase in order to submit the food order to a restaurant's kitchen for preparation of the food. As another example, were the device an automated teller machine (ATM) and the selector were a selector authorizing a cash withdrawn from a bank account, selection of the selector may command the device to dispense cash in the appropriate amount. As but one more example, if the device were a tablet computer, an application icon may establish the selector and the selector may be selected to launch a particular application at the device, such as an Internet browser application, word processing application, or email application.

Now in reference to FIG. 13, it shows an example GUI 1300 for a system administrator or end-user to configure one or more settings of a device that operates consistent with present principles. It is to be understood that each of the options or sub-options to be described below may be selected by directing touch or cursor input to the check box adjacent to the respective option.

As shown, a first option 1302 may be presented on the GUI 1300 and may be selectable to set or configure the device to operate consistent with present principles. For example, the option 1302 may be selected to enable the device to, in the future, undertake the operations discussed above in reference to FIGS. 4-11 and to execute the logic of FIG. 12.

Beneath the option 1302 may be various sub-options 1304-1310 for setting the device to, according to user height or user inputs, move from default the locations of selectors (option 1304) and/or sensitivity areas (option 1306). A sub-option 1308 may also be presented to set the device to enlarge touch sensitivity areas and/or to reduce the presentation size of selectors as described in reference to FIG. 7 above. Additionally, a sub-option 1310 may be presented to set the device to adjust the orientation of prisms as described herein.

As also shown in FIG. 13, the GUI 1300 may include an option 1312 that is selectable to set the device to use a user's height for determining offsets consistent with present principles. Option 1314 may be selected to configure the device to use a calibration process for determining offsets, e.g., as described above in reference to FIG. 11. Option 1316 may be selected to use user inputs where the user misses a center point of a given selector as monitored at a corresponding sensitivity area consistent with present principles.

The end-user or system administrator may even direct numerical input to input box 1318 using a hard or soft keyboard in order to establish a threshold number of misses that should occur prior to the device applying offsets. The threshold number of misses may be used, for example, to increase the device's confidence that offsets should be applied and thus to prevent the device from performing offsets based on a single erroneous input. Accordingly, the threshold may be set at two as shown in the box 1318, or may be set to another amount greater than one.

FIG. 13 also shows that the GUI 1300 may include an input box 1320 at which the user may enter numerical input in order to establish a threshold distance for a user within which the device will determine offsets based on user height (and/or present a calibration screen) consistent with present principles. In this example, the threshold distance has been set to five feet, but regardless, it is to be understood that the threshold distance may be less than a maximum distance at which the user is detectable using the camera (or other sensor).

Figure 14:
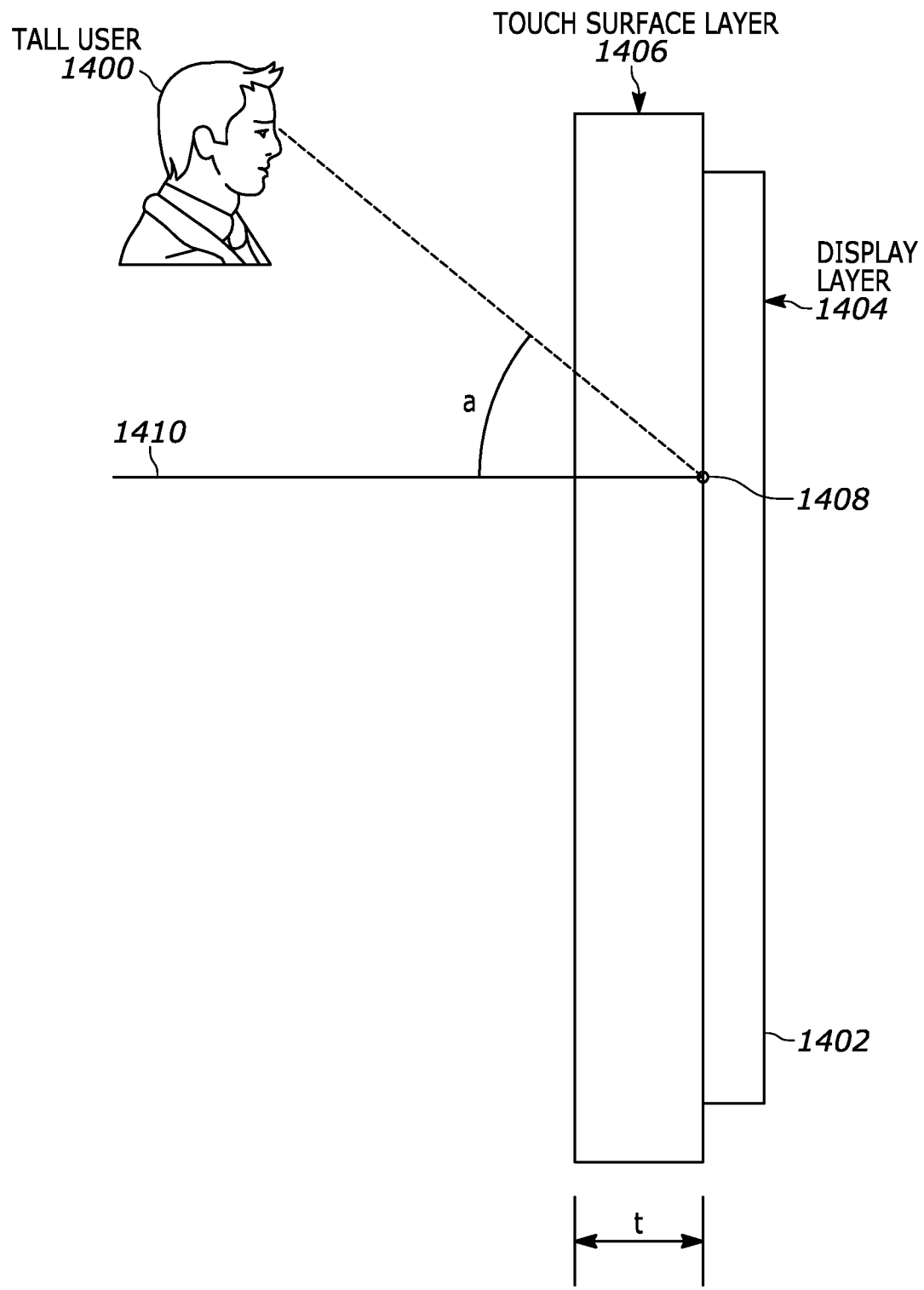
FIG. 14 shows a schematic diagram of a user's viewing angle to a touch-enabled display consistent with present principles.

Now describing FIG. 14, it shows an example in schematic side view of the viewing angle "a" of a user 1400 with respect to a particular selector 1408 presented on a touch-enabled display 1402. As shown, the touch-enabled display 1402 may include a display layer 1404 that may be similar in function and configuration to the display layer 302 of FIG. 3. The display 1402 may also include a touch surface layer 1406 that may be similar to the touch sensing layer 301 described above and in some examples may also include a layer similar to the layer 304 described above.

As reflected in FIG. 14, the viewing angle "a" may be learned by the device by determining the height of the horizontal level line 1410 for the control/selector 1408 (denoted in the following equation using the variable "h"), the tallness/height of the user 1400 (denoted in the following equation using the variable "u"), the thickness of the layer 1406 (denoted in the following equation using the variable "t" as determined, e.g., from prestored data), and the lateral distance between the user 1400 and display layer 1404 (e.g., as discerned by the user-locating parts such as a camera). The equation for determining the viewing angle "a" may therefore be $a=\tan^{-1}((u-h)/t)$.

The offset to then be applied can be geometrically calculated according to the user's height and position using the equation $\text{offset}=t*\sin(a)$.

Thus, the viewing angle of the user 1400 to each screen control/selector height may be slightly different depending on the height of the selector itself and therefore the lower on the display the selector is presented, the greater the viewing angle and thus the greater offset to be applied.

It may now be appreciated that present principles provide for an improved computer-based user interface that improves the functionality and ease of use of the touch-enabled devices disclosed herein. The disclosed concepts are rooted in computer technology for computers to carry out their functions.

It is to be understood that whilst present principals have been described with reference to some example embodiments, these are not intended to be limiting, and that various alternative arrangements may be used to implement the subject matter claimed herein. Components included in one embodiment can be used in other embodiments in any appropriate combination. For example, any of the various components described herein and/or depicted in the Figures may be combined, interchanged or excluded from other embodiments.

What is claimed is:

1. A device, comprising:
at least one processor;
a touch-enabled display accessible to the at least one processor; and
storage accessible to the at least one processor and comprising instructions executable by the at least one processor to:
present a graphical user interface (GUI) on the touch-enabled display, the GUI comprising a setting that is selectable to set the device to, in the future, reduce the presentation size of selectors based on identified heights of different users;
identify a height of a first user; and
based on the height of the first user, reduce a size of a first selector presentable on the touch-enabled display and present the first selector on the touch-enabled display according to the reduction of size.

2. The device of claim 1, wherein the size of the first selector is reduced from a default presentation size for the first selector.

3. The device of claim 1, wherein the size of the first selector is reduced so that the greater the difference between the user's height and a height of the first selector, the smaller the first selector is presented on the touch-enabled display.

4. The device of claim 1, wherein the instructions are executable to:
based on the height of the first user, enlarge a sensitivity area corresponding to selection of the first selector so that the sensitivity area is enlarged from a default sensitivity area size.

5. The device of claim 4, wherein the instructions are executable to:
based on the height of the first user, enlarge the sensitivity area so that the greater the difference between the first user's height and the height of the sensitivity area, the greater the area used for receiving touch inputs related to selection of the first selector.

6. The device of claim 1, wherein the instructions are executable to:
based on the height of the first user, enlarge a sensitivity area corresponding to selection of the first selector so that the sensitivity area is larger than a default sensitivity area size while the first selector is presented according to the reduction of size.

7. The device of claim 1, wherein the instructions are executable to:
use an inverse cosine function to determine the first user's viewing angle to the first selector relative to normal.

8. The device of claim 7, wherein the instructions are executable to:
reduce, proportional to the viewing angle, the size of the first selector from a default size.

9. The device of claim 8, wherein the instructions are executable to:
reduce, proportional to the viewing angle, the size of the first selector from the default size according to preset amounts from a relational database to which the at least one processor has access.

10. A method, comprising:
identifying, using a device, a height of a user; and
based on the identifying of the height of the user, reducing a size of a selector presentable on a display and presenting the selector on the display according to the reduction of size;
wherein the size of the selector is reduced so that the greater the difference between the user's height and a height of the selector, the smaller the selector is presented on the display.

11. The method of claim 10, wherein the size of the selector is reduced from a default presentation size for the selector.

12. The method of claim 10, comprising:
based on the identifying of the height of the user, enlarging a sensitivity area of the display corresponding to selection of the selector so that the sensitivity area is enlarged from a default sensitivity area size.

13. The method of claim 12, comprising:
based on the identifying of the height of the user, enlarging the sensitivity area so that the greater the difference between the user's height and the height of the sensitivity area, the greater the area used for receiving touch inputs related to selection of the selector.

14. The method of claim 10, comprising:
based on the identifying of the height of the user, enlarging a sensitivity area of the display corresponding to selection of the selector so that the sensitivity area is larger than a default sensitivity area size while the selector is presented on the display according to the reduction of size.

15. The method of claim 10, comprising:
using an inverse cosine function to determine the user's viewing angle to the selector relative to normal.

16. The method of claim 15, comprising:
reducing, proportional to the viewing angle, the size of the selector from a default size.

17. The method of claim 10, comprising:
presenting a graphical user interface (GUI) on the display, the GUI comprising an option that is selectable to set the device to, in the future, reduce the presentation size of selectors based on identified heights of users.

18. At least one computer readable storage medium (CRSM) that is not a transitory signal, the computer readable storage medium comprising instructions executable by at least one processor to:
identify a height of a user; and
based on the height of the user, enlarge a sensitivity area of a display, the sensitivity area corresponding to selection of a selector, the sensitivity area being enlarged so that the greater the difference between the user's height and a height of the sensitivity area, the greater the area used for receiving touch inputs at the display to select the selector.

19. The CRSM of claim 18, wherein the instructions are executable to:
present a graphical user interface (GUI), the GUI comprising an option that is selectable to set the at least one processor to, in the future, reduce the respective sensitivity areas of respective selectors based on identified heights of users.

20. The CRSM of claim 18, wherein the instructions are executable to:
based on the height of the user, reduce the size of the selector as presented on the display so that the greater the difference between the user's height and a height of the selector, the smaller the selector is presented on the display.

* * * * *